United States Patent
Li et al.

(10) Patent No.: US 8,149,323 B2
(45) Date of Patent: Apr. 3, 2012

(54) SYSTEM AND METHOD TO AUTOFOCUS ASSISTED BY AUTOEXPOSURE CONTROL

(75) Inventors: Jingqiang Li, Austin, TX (US); Ruben M. Velarde, Chula Vista, CA (US); Szepo R. Hung, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 624 days.

(21) Appl. No.: 12/338,147

(22) Filed: Dec. 18, 2008

(65) Prior Publication Data

US 2010/0157136 A1    Jun. 24, 2010

(51) Int. Cl.
*G03B 13/00* (2006.01)
*H04N 5/232* (2006.01)

(52) U.S. Cl. .......... 348/345; 348/222.1; 348/229.1

(58) Field of Classification Search .......... 348/222.1, 348/229.1, 345, 362
See application file for complete search history.

(56) References Cited

U.S. PATENT DOCUMENTS

| | | | |
|---|---|---|---|
| 4,985,723 A | 1/1991 | Egawa et al. | |
| 6,452,634 B1 | 9/2002 | Ishigami et al. | |
| 6,567,123 B1 | 5/2003 | Hashimoto | |
| 6,970,198 B1 | 11/2005 | Schinner et al. | |
| 6,972,799 B1 * | 12/2005 | Hashimoto | 348/350 |
| 2003/0193600 A1 * | 10/2003 | Kitamura et al. | 348/333.01 |
| 2005/0052553 A1 | 3/2005 | Kido et al. | |
| 2005/0264679 A1 * | 12/2005 | Sasaki et al. | 348/345 |
| 2007/0035650 A1 | 2/2007 | Suzuki | |
| 2007/0288973 A1 | 12/2007 | Glatron et al. | |
| 2008/0297613 A1 | 12/2008 | Takahashi et al. | |
| 2009/0066827 A1 * | 3/2009 | Ikeda et al. | 348/311 |
| 2009/0244334 A1 * | 10/2009 | Otaka | 348/294 |

FOREIGN PATENT DOCUMENTS

| | | |
|---|---|---|
| CN | 101078857 | 11/2007 |
| JP | 2004064279 | 2/2004 |
| WO | WO2006080562 | 8/2006 |

OTHER PUBLICATIONS

International Search Report & Written Opinion—PCT/US2009/065687, International Search Authority—European Patent Office—Feb. 26, 2010.
International Preliminary Report on Patentability—PCT/US2009/065687—The International Bureau of WIPO—Geneva, Switzerland, Mar. 16, 2011.

* cited by examiner

*Primary Examiner* — Gevell Selby
(74) *Attorney, Agent, or Firm* — Matthew J. Evans; James R. Gambale, Jr.

(57) ABSTRACT

In a particular embodiment, a method is disclosed that includes comparing a frame rate of image capture by an image sensor to a frame rate threshold at an image capture device. The method also includes when the frame rate is less than the frame rate threshold, increasing the frame rate to a modified frame rate that is greater than or at least equal to the frame rate threshold. The method further includes performing an autofocus operation on an image to be captured at the modified frame rate.

25 Claims, 11 Drawing Sheets

SYSTEM AND METHOD TO AUTOFOCUS ASSISTED BY AUTOEXPOSURE CONTROL

I. FIELD OF THE DISCLOSURE

The present disclosure is generally directed to a system and method to autofocus assisted by autoexposure control.

II. BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, wireless telephones can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Digital signal processors (DSPs), image processors, and other processing devices are frequently used in portable personal computing devices that include digital cameras, or that display image or video data captured by a digital camera. Such processing devices can be utilized to provide video and audio functions, to process received data such as image data, or to perform other functions.

Latency and accuracy are quality measures of an autofocus (AF) system of a digital camera. Latency may be inversely proportional to a frame rate of the digital camera, where the frame rate is usually given in frames per second (FPS). Accuracy may be related to the autofocus search algorithm, as well as to random errors that affect sharpness statistics. Conventionally, in low light conditions, exposure control will typically increase the exposure time to reduce the noise effect and will, therefore, decrease the frame rate and increase hand-shake blur of a handheld digital camera. However, the decreased frame rate will increase the autofocus latency, while the hand-shake blur or jitter will reduce the accuracy of the sharpness statistics and, thus, adversely affect the final autofocus accuracy.

III. SUMMARY

In a particular embodiment, a method is disclosed that includes comparing a frame rate of image capture by an image sensor to a frame rate threshold at an image capture device. When the frame rate is less than the frame rate threshold, the method includes increasing the frame rate to a modified frame rate that is greater than or at least equal to the frame rate threshold. The method further includes performing an autofocus operation on an image to be captured at the modified frame rate.

In another embodiment, an image capture method is disclosed that includes preparing to capture an image using a lens system coupled to an image sensor of an image capture device. The method also includes adjusting an image signal gain of an image signal output from the image sensor. The method further includes processing the adjusted image signal using a digital signal processor in the image capture device. The digital signal processor is coupled to an autoexposure controller and to an autofocus device in the image capture device. The method also includes selectively increasing a frame rate of image capture by the image sensor of the image capture device using the autoexposure controller when the frame rate is below a predetermined frame rate. The method further includes reducing an exposure time of the image sensor of the image capture device using the autoexposure controller after increasing the frame rate. The method also includes increasing the image signal gain to adjust a brightness level of the image. The method further includes performing an autofocus operation using the autofocus device to adjust a lens position of the lens system to focus the image.

In another embodiment, an image capture device is disclosed. The image capture device includes an autoexposure control device configured to selectively increase a frame rate of image capture by an image sensor to an increased frame rate. The autoexposure control device is further configured to reduce an exposure time of the image sensor to a reduced exposure time and increase an image signal gain of an image signal output from the image sensor to an increased image signal gain to adjust an image brightness level. The image capture device further includes an autofocus device configured to perform an autofocus operation on an image using at least one of the increased frame rate, the reduced exposure time, and the increased image signal gain.

In another embodiment, an image capture device is disclosed. The image capture device includes means for controlling an autoexposure to selectively increase a frame rate of image capture by an image sensor to an increased frame rate. The means for controlling an autoexposure further reduces an exposure time of the image sensor to a reduced exposure time and increases an image signal gain of an image signal output from the image sensor to an increased image signal gain to adjust an image brightness level. The image capture device further includes means for performing an autofocus operation on an image using at least one of the increased frame rate, the reduced exposure time, and the increased image signal gain.

In another embodiment, a portable device including a camera is disclosed. The portable device includes an autoexposure control device configured to increase a frame rate of capture of an image by an image sensor to a modified frame rate at least equal to a frame rate threshold at the camera. The autoexposure control device is further configured to reduce an exposure time at the camera to a reduced exposure time and increase an image signal gain at the camera to an increased image signal gain to adjust an image brightness level. The portable device also includes means for performing an autofocus operation on the image at the modified frame rate, the reduced exposure time, and the increased image signal gain.

In another embodiment, a computer-readable medium is disclosed. The computer-readable medium includes computer executable instructions that are operative to cause a computer to increase a frame rate of capture of an image by an image sensor. The frame rate is increased to a modified frame rate that is greater than or at least equal to a frame rate threshold at an image capture device. The computer executable instructions are further operative to cause the computer to reduce an exposure time of the image sensor at the image capture device and increase an image signal gain of an image signal output from the image sensor at the image capture device.

One particular advantage provided by the disclosed embodiments is that an autoexposure control device switches into an autofocus assistance mode to improve one or more of the autofocus quality measures.

Another advantage provided by the disclosed embodiments is that one or both of the autofocus latency and accuracy can be improved.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
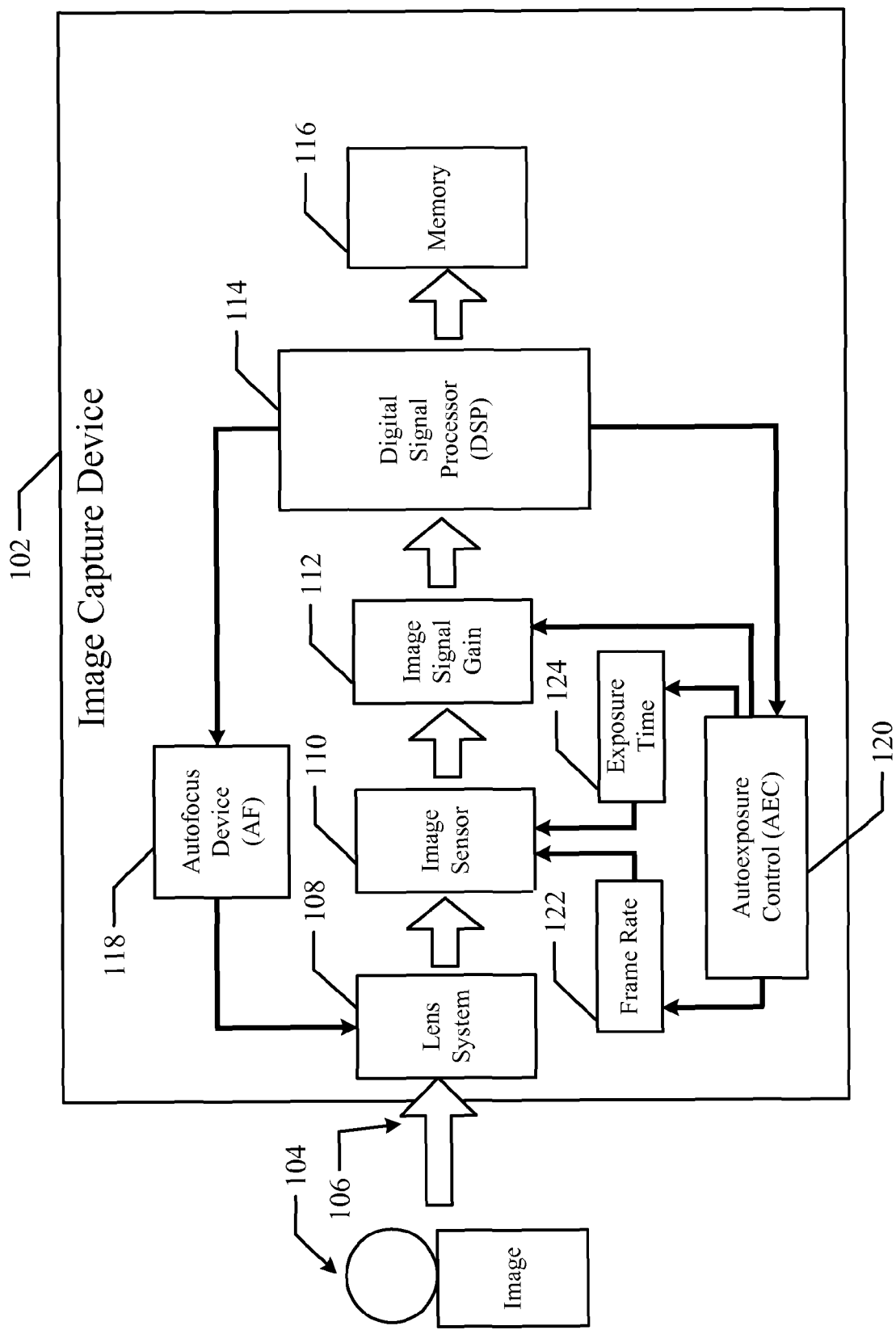
FIG. 1 is a block diagram of a first illustrative embodiment of an image capture device including an autofocus device assisted by an autoexposure control device.

Referring to FIG. 1, an image capture device 102 is illustrated. The image capture device 102 includes a lens system 108, an image sensor 110, an image signal gain element 112, and a digital signal processor (DSP) 114. The image capture device 102 also includes a memory 116, such as a random access memory device or a non-volatile memory device such as a read-only memory or flash memory. The image capture device 102 further includes an autofocus device (AF) 118 and an autoexposure control device (AEC) 120. The lens system 108 is responsive to an image input 106 which receives an image 104. The lens system 108 has an input responsive to the autofocus device 118, which, in turn, receives feedback input from the digital signal processor 114.

The autoexposure control device 120 has an input responsive to the digital signal processor 114. The autoexposure control device 120 provides an output to the image sensor 110 and the image signal gain element 112. In a particular embodiment, the autoexposure control device 120 provides frame rate data 122 to the image sensor 110 and also provides exposure time data 124 to the image sensor 110 for control of the image sensor 110. The digital signal processor 114 is coupled to and has access to the memory 116.

The image sensor 110 is configured to capture an image such as the image 104 which is received at the lens system 108. The autoexposure control device and/or module 120 is configured to perform a plurality of functions such as to increase a frame rate of image capture by the image sensor 110 to an increased frame rate, to reduce an exposure time of the image sensor 110 to a reduced exposure time, or to increase an image signal gain of an image signal output from the image sensor 110 to an increased image signal gain. The increased image signal gain as controlled by the autoexposure control device 120 may adjust an image brightness level of the captured image. Thus, the image signal gain element 112 is adjusted under control of the autoexposure control device 120, providing an image having a higher brightness level as received by the digital signal processor 114.

The autofocus device 118 is configured to perform an autofocus operation on the captured image as received and processed by the digital signal processor 114 using the increased frame rate, the reduced exposure time, and the increased image signal gain as described above with respect to operations and functionality control led by the autoexposure control device 120. In another embodiment, the autofocus device 118 is configured to perform the autofocus operation on the image using one or more of the functions of increased frame rate, reduced exposure time, and/or increased image signal gain. Performance of the above functions by the autofocus device 118 may yield increased image accuracy, reduced jitter effects, and reduced latency. In a particular example, hand jitter of an image capture device, such as a camera held by a user, is reduced through use of the autofocus device 118 functionality.

In a particular embodiment, the autoexposure control device 120 is further configured to reduce an integration time of integrating the image 104 at the image sensor 110 when the frame rate is not less than a predetermined frame rate. The predetermined frame rate may be a default frame rate such as a dictated or defined frame rate determined at the time of manufacture. Alternatively, the predetermined frame rate may be user controlled via a user interface of the image capture device 102.

During operation, the image 104 is received via the input 106 at the lens system 108. The lens system 108 focuses the received image 104 and provides a focused image to the image sensor 110. The image sensor 110, having certain parameters defined or controlled by the autoexposure control device 120, senses the image 104 and provides sensed image data to the image signal gain element 112. In a particular example, the frame rate 122 and the exposure time 124 are provided by the autoexposure control device 120 for the image sensor 110 to sense and then provide the sensed image to the image signal gain element 112. The image signal gain element 112 applies a signal gain to the image 104 received from the image sensor 110. The image signal gain element 112 also receives control parameters from the autoexposure control device 120 and may receive an adjusted gain level from the autoexposure control device 120. The image signal gain element 112 then applies the gain level to the sensed image 104 from the image sensor 110 and provides a gain-enhanced image having the gain factor applied as an output that is directed to the digital signal processor 114.

The digital signal processor 114 then processes the gain-enhanced image from the image signal gain element 112. The digital signal processor 114 provides feedback information to both the autofocus device 118 and to the autoexposure control device 120. The digital signal processor 114 processes the received image data from the image signal gain element 112 and then adjusts control signals to enhance capture of the image 104. For example, the digital signal processor 114 sends control signals to the autofocus device 118 to adjust the focus of the lens system 108. As another example, the digital signal processor 114 provides control signals to the autoexposure control device 120 to adjust the frame rate 122, the exposure time 124, or both, which in turn are provided to the image sensor 110 in a feedback control system manner.

After the digital signal processor 114 receives enhanced image data from the image signal gain element 112, the digital signal processor 114 then outputs the enhanced image data to the memory 116. The stored image data at the memory 116 may be communicated to an additional electronic device or may be displayed for a user. By coordinating actions of the autoexposure control device 120 and the autofocus device 118 under the control of the digital signal processor 114, the image capture device 102 may employ the autoexposure control device 120 in a manner to assist the autofocus device 118 in performing the function of adjusting the lens system 108 and the lens system focus at the lens system 108. A particular example of an available enhancement is reduced jitter that may be caused by hand jitter of a user that captures the image 104 using a handheld image capture device 102.

Figure 2:
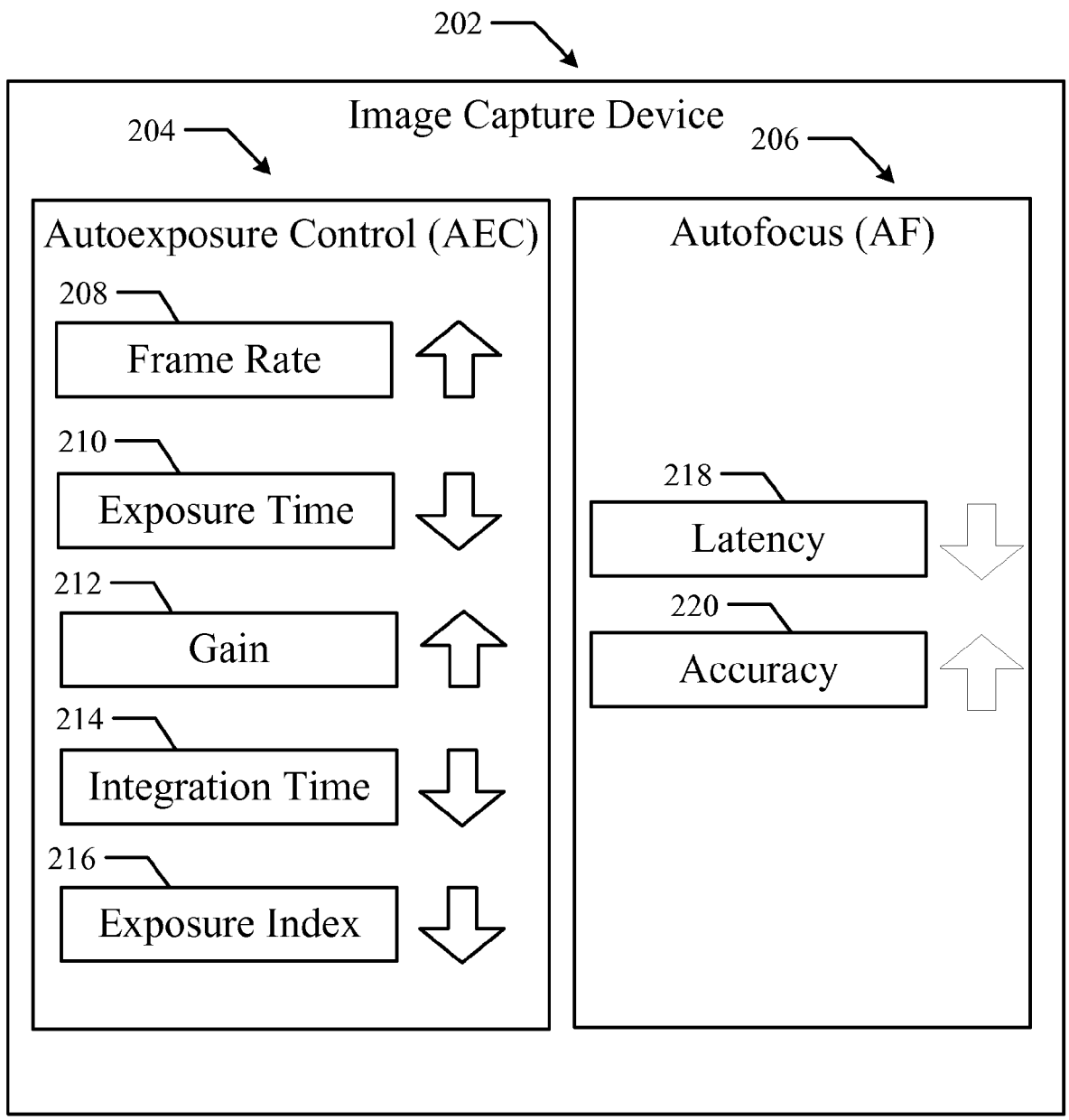
FIG. 2 is a block diagram of a second illustrative embodiment of an image capture device including an autofocus device assisted by an autoexposure control device.

Referring to FIG. 2, another embodiment of an image capture device 202 is illustrated. The image capture device 202 includes an autoexposure control device 204 and an autofocus device 206. In a particular embodiment, the autoexposure control device 204 and the autofocus device 206 may be implemented in a fashion similar to the autoexposure control device 120 and the autofocus device 118 of FIG. 1.

The autoexposure control device 204 has the capability to increase or decrease various parameters. In a particular embodiment, the various parameters include frame rate 208, exposure time 210, gain 212, integration time 214, and exposure index 216. In a particular embodiment, the autoexposure control device 204 is configured to reduce an exposure index 216 of an image sensor, such as the image sensor 110 of FIG. 1. The exposure index 216 is an integer that represents a combination of the exposure time 210 and the gain 212. In a particular embodiment, reducing the exposure index 216 by about 23 may result in reducing the integration time 214 of integrating an image, such as the image 104 of FIG. 1, at an image sensor, such as the image sensor 110 of FIG. 1, by about one half.

In a particular illustrated example, the autoexposure control device 204 increases the frame rate 208, decreases the exposure time 210, increases the gain 212, decreases integration time 214 and decreases the exposure index 216. As illustrated in FIG. 2, this leads to the autofocus device 206 having a reduced latency 218 and an increased accuracy 220. As described above, the frame rate 208 and the latency 218 may be inversely related to each other so that increasing the frame rate 208 may lead to the reduced latency 218. Similarly, increasing the frame rate 208 and decreasing the exposure time 210 may lead to a reduction in hand-shake blur and jitter, which may lead to the increased accuracy 220 of the autofocus device 206.

Figure 3:
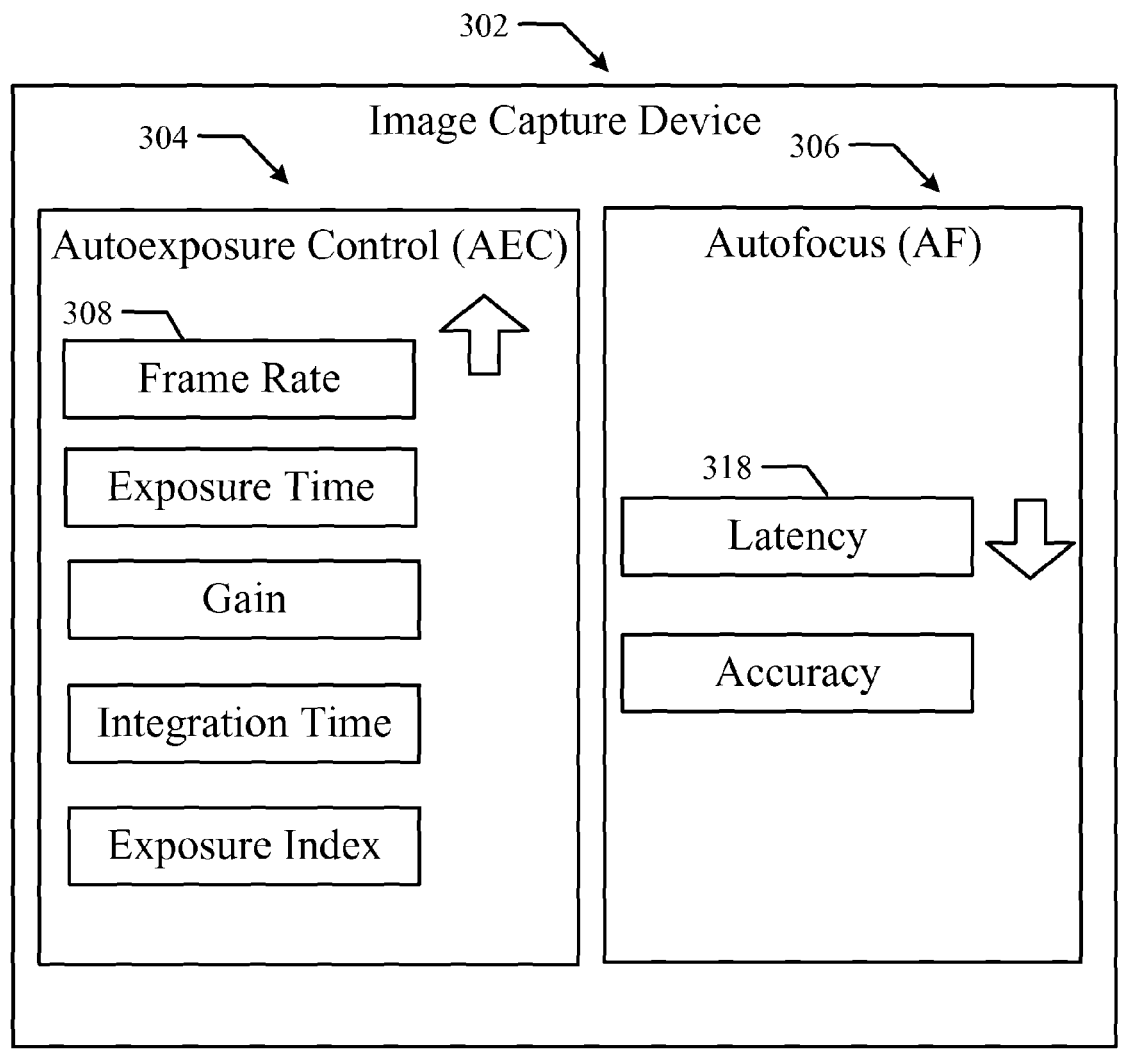
FIG. 3 is a block diagram of a third illustrative embodiment of an image capture device including an autofocus device assisted by an autoexposure control device.

Referring to FIG. 3, in another embodiment, an image capture device 302, which includes an autoexposure control device 304 and an autofocus device 306, may have parameters adjusted in a manner similar to the image capture device 202 of FIG. 2 and/or the image capture device 102 of FIG. 1. In a particular illustrative embodiment, the autoexposure control device 304 increases a frame rate 308, which, in turn, leads to the autofocus device 306 having reduced latency 318, as illustrated.

Figure 4:
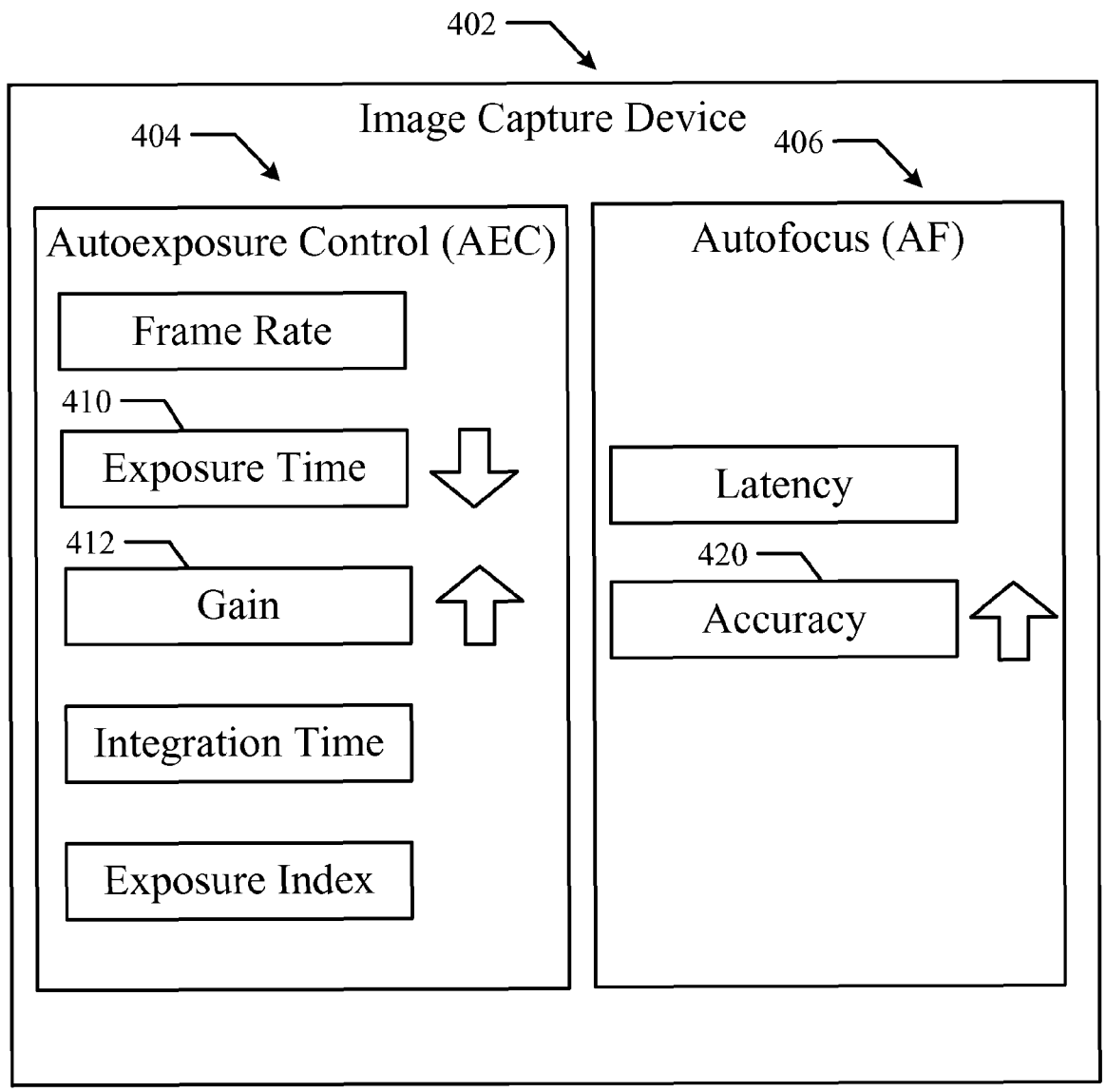
FIG. 4 is a block diagram of a fourth illustrative embodiment of an image capture device including an autofocus device assisted by an autoexposure control device.

Referring to FIG. 4, another particular illustrated embodiment of an image capture device 402 is shown. The image capture device 402 includes an autoexposure control device 404 and an autofocus device 406. In the embodiment of FIG. 4, an exposure time 410 is decreased and a gain 412 is increased by the autoexposure control device 404. As a result of decreasing the exposure time 410 and increasing the gain 412, the autofocus device 406 has improved or increased accuracy 420, as illustrated.

Figure 5:
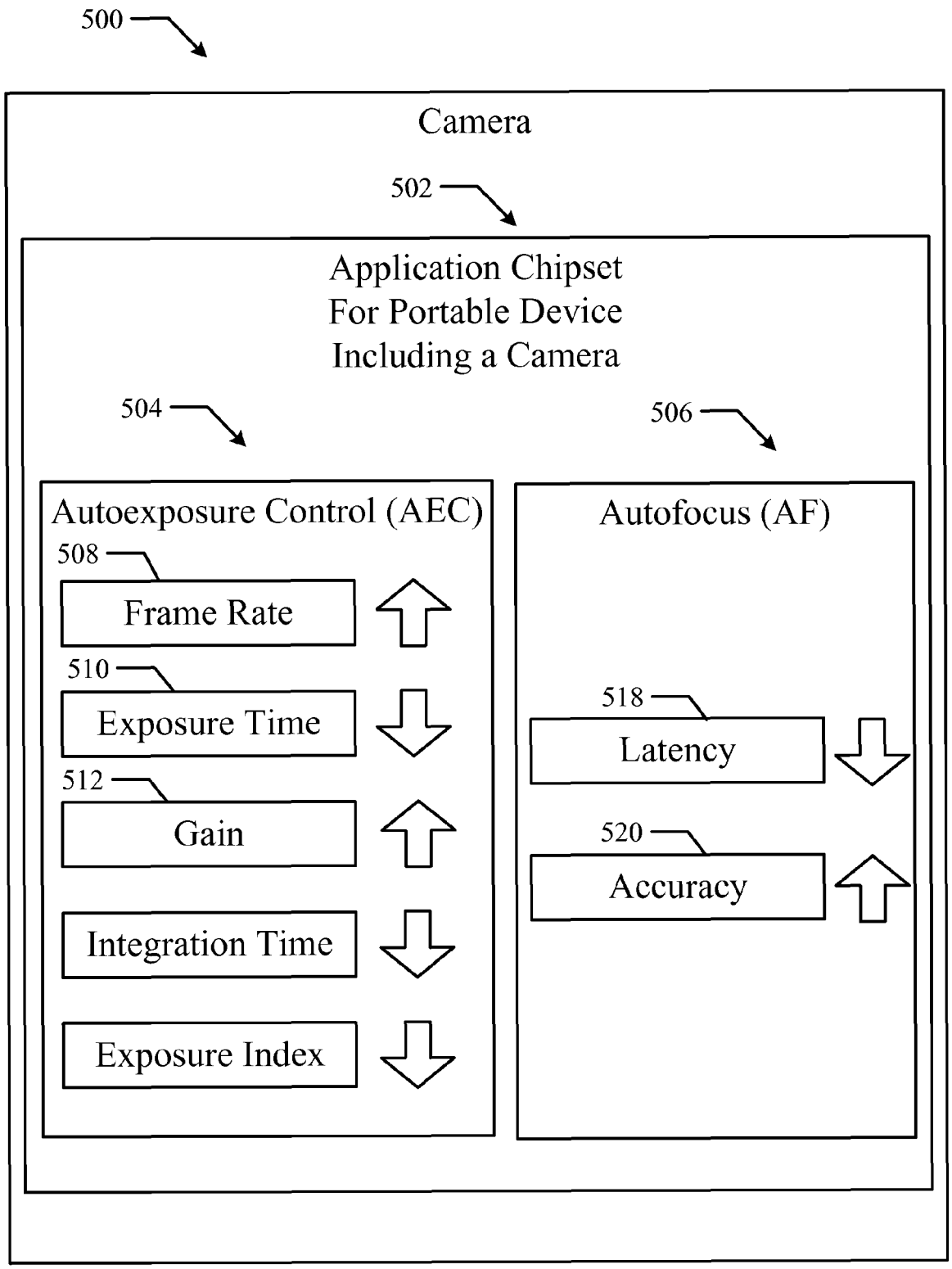
FIG. 5 is a block diagram of a first illustrative embodiment of a portable device including a camera including an autofocus device assisted by an autoexposure control device.

Referring to FIG. 5, a portable device including a camera 500 is illustrated. The portable device including the camera 500 further includes an application chip set 502 for the portable device. The application chip set 502 includes an autoexposure control device 504 and means for performing an autofocus operation, such as an autofocus device 506. The means for performing an autofocus operation may include autofocusing circuitry, autofocusing software executed by a processor, mechanical autofocusing devices, or any combination thereof. The autoexposure control device 504 is configured to increase a frame rate 508 of capture of an image by an image sensor to a modified frame rate that is at least equal to a frame rate threshold at the camera 500, as illustrated. The autoexposure control device 504 is also configured to reduce an exposure time 510 at the camera 500 to a reduced exposure time and to increase an image signal gain 512 at the camera 500 to an increased image signal gain to adjust an image brightness level. The autofocus device 506 is configured to perform an autofocus operation on the image at the modified frame rate, at the reduced exposure time, and at the increased image signal gain level. The result is decreased latency 518 and improved accuracy 520, as shown. In a particular illustrative embodiment, the autoexposure control device 504 and the autofocus device 506 are disposed within a single application chip set 502 that is within the portable electronic device including the camera 500.

Figure 6:
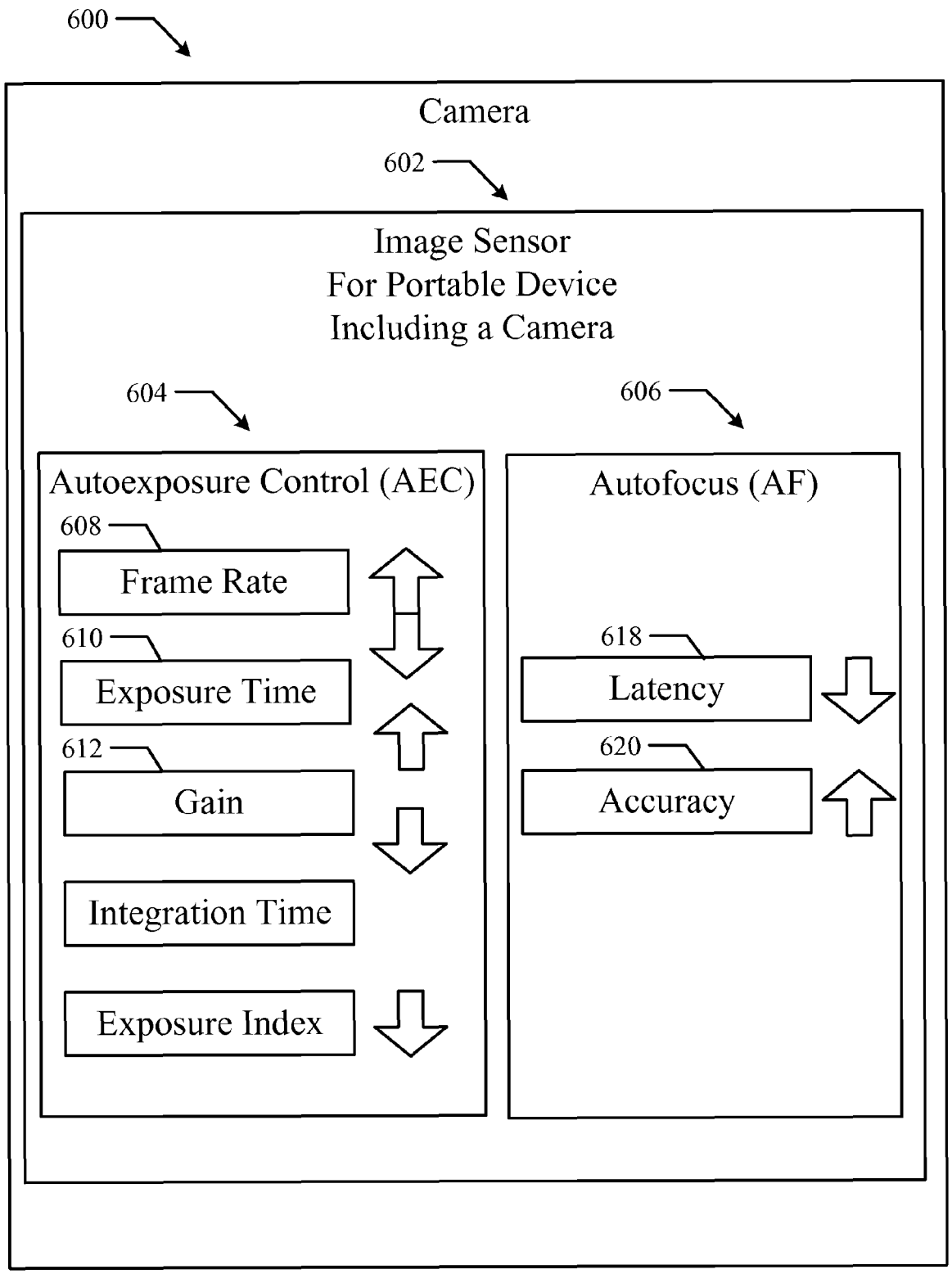
FIG. 6 is a block diagram of a second illustrative embodiment of a portable device including a camera including an autofocus device assisted by an autoexposure control device.

Referring to FIG. 6, a particular embodiment of a portable device that includes a camera 600 is illustrated. The portable device including the camera 600 includes an image sensor 602. In a particular illustrative embodiment, the image sensor 602 may be implemented as a component 110 as in the image capture device 102 of FIG. 1. The image sensor 602 within the portable device that includes the camera 600 further includes an autoexposure control device 604 and means for performing an autofocus operation, such as an autofocus device 606. Thus, the portable device that includes the camera 600 and the image sensor 602 has embedded within the image sensor 602 both the autoexposure control device 604 and the autofocus device 606. Thus, the autoexposure control device 604 and the autofocus device 606 may be implemented in an embedded fashion within an image sensor 602 for tighter control and potentially lower costs due to circuitry integration.

The autoexposure control device 604 is configured to increase a frame rate 608 of capture of an image by an image sensor to a modified frame rate that is at least equal to a frame rate threshold at the camera 600, as illustrated. The autoexposure control device 604 is also configured to reduce an exposure time 610 at the camera 600 to a reduced exposure time and to increase an image signal gain 612 at the camera 600 to an increased image signal gain to adjust an image brightness level. The autofocus device 606 is configured to perform an autofocus operation on the image at the modified frame rate, at the reduced exposure time, and at the increased image signal gain level. The result is decreased latency 618 and improved accuracy 620, as shown.

Figure 7:
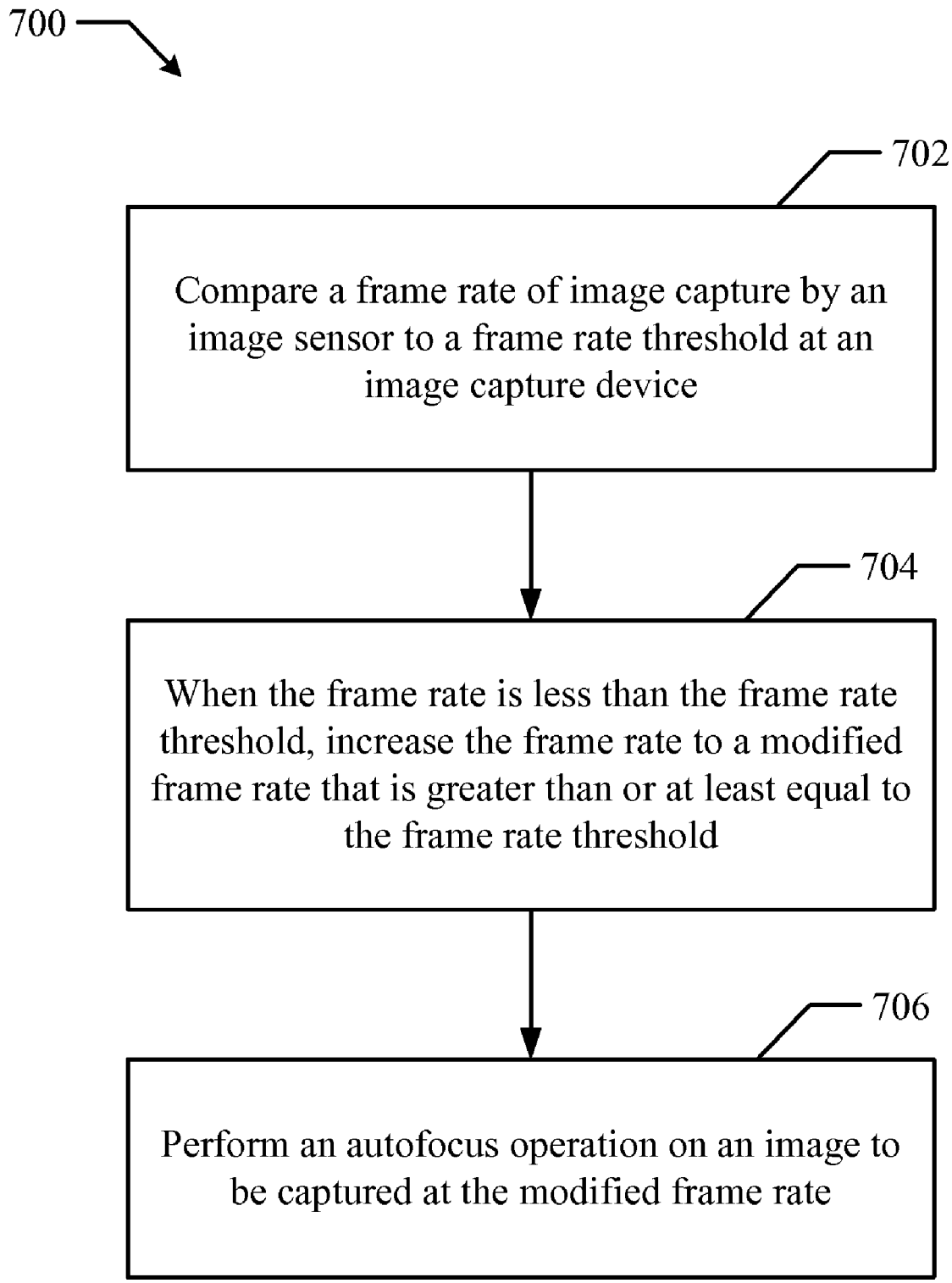
FIG. 7 is a flow diagram of a first illustrative embodiment of a method to perform an autofocus operation assisted by autoexposure control.

Referring to FIG. 7, a particular embodiment of a method of capturing and processing image data is illustrated at 700. The method 700 includes comparing a frame rate of image capture by an image sensor to a frame rate threshold at an image capture device, at 702. When the frame rate is less than the frame rate threshold, the method 700 includes increasing the frame rate to a modified frame rate that is greater than or equal to the frame rate threshold, at 704. The method 700 further includes performing an autofocus operation on an image to be captured at the modified frame rate, at 706. In a particular embodiment, the frame rate threshold is a maximum frame rate for the image capture device, and the modified frame rate is approximately equal to the maximum frame rate. In a particular embodiment, the maximum frame rate for the image capture device may be in a range of about 20 frames per second (FPS) to about 30 frames per second (FPS). Alternatively, the modified frame rate is in a range of about 1.5 times the frame rate to about 3 times the frame rate. Specifically, the modified frame rate may be at a level approximately 2 times the frame rate.

In a particular embodiment, the method 700 further includes reducing an exposure index at the image capture device before performing the autofocus operation. In a particular embodiment, the image capture device may include one of a digital camera, a digital video camera or a camera telephone. Further, the method 700 may include increasing an image signal gain at the image capture device to adjust an image brightness level before performing the autofocus operation on the image to be captured at the modified frame rate. The result of performing the illustrated method 700 may include benefits such as reduced effects of hand jitter and increased brightness levels.

In another particular embodiment, the method 700 includes decreasing an integration time at the image capture device and increasing an image signal gain at the image capture device to adjust an image brightness level before performing an autofocus operation on the image to be captured at the modified frame rate. In addition, the method 700 may further include reducing an integration time at the image capture device when the frame rate is not less than the frame rate threshold.

Figure 8:
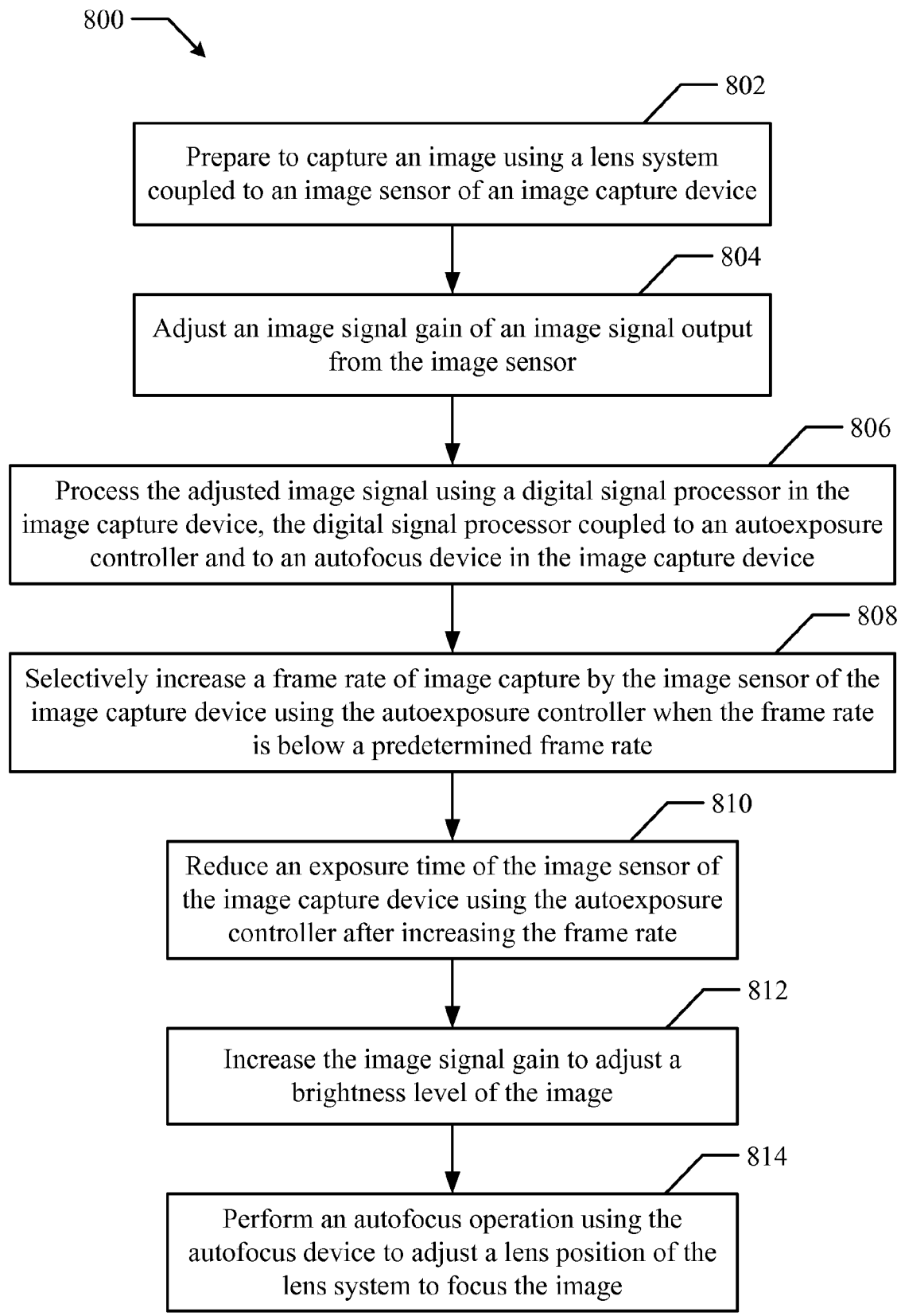
FIG. 8 is a flow diagram of a second illustrative embodiment of a method to perform an autofocus operation assisted by autoexposure control.

Referring to FIG. 8, a particular embodiment of a method of capturing and processing image data is illustrated at 800. The image capture method 800 includes preparing to capture an image using a lens system coupled to an image sensor of an image capture device, at 802. For example, as shown in FIG. 1, the image 104 may be captured using the lens system 108 coupled to the image sensor 110 of the image capture device 102. The method 800 also includes adjusting an image signal gain of an image signal output from the image sensor, at 804. For example, as shown in FIG. 1, the image signal output from the image sensor 110 may be adjusted using the image signal gain element 112. The method 800 further includes processing the adjusted image signal using a digital signal processor in the image capture device, the digital signal processor coupled to an autoexposure controller and to an autofocus device disposed in the image capture device, at 806. For example, as shown in FIG. 1, the digital signal processor 114 coupled to the autoexposure controller 120 and to the autofocus device 118 disposed in the image capture device 102 may process the adjusted image signal.

The method 800 also includes selectively increasing a frame rate of image capture by the image sensor of the image capture device using the autoexposure controller when the frame rate is below a predetermined frame rate, at 808. For example, as shown in FIG. 1, the frame rate of image capture by the image sensor 110 of the image capture device 102 may be selectively increased by the autoexposure controller 120 when the frame rate is below a predetermined frame rate, as indicated at 122. The method 800 further includes reducing an exposure time of the image sensor of the image capture device using the autoexposure controller after increasing the frame rate, at 810. For example, as shown in FIG. 1, the exposure time of the image sensor 110 of the image capture device 102 may be reduced by the autoexposure controller 120 after increasing the frame rate, as indicated at 124.

The method 800 also includes increasing the image signal gain to adjust a brightness level of the image, at 812. For example, as shown in FIG. 1, the image signal gain element 112 may be used to increase the gain of the image signal output from the image sensor 110 to adjust the brightness level of the image. The method 800 further includes performing an autofocus operation using the autofocus device to adjust a lens position of the lens system to focus the image, at 814. For example, as shown in FIG. 1, the autofocus device 118 may be used to perform an autofocus operation to adjust a lens position of the lens system 108 to focus the image 104. The method 800 may further include determining the lens position corresponding to the highest image contrast of the image to be captured. The method 800 may further include returning the frame rate, the exposure time, and the image signal gain to the original values after the lens position is determined.

The method 800 may further include reducing an exposure index using the autoexposure controller and increasing the image signal gain to adjust the brightness level of the image using the autoexposure controller. For example, as shown in FIG. 2, the exposure index 216 at the image capture device 202 may be reduced by the autoexposure control device 204, and the gain 212 of the image signal may be increased by the autoexposure control device 204. The method 800 may further include decreasing an integration time of integrating the image at the image sensor of the image capture device. For example, as shown in FIG. 2, the integration time 214 at the image capture device 202 may be reduced by the autoexposure control device 204.

The method 800 may further include reducing an integration time of integrating the image at the image sensor of the image capture device when the frame rate is not less than the predetermined frame rate. The method 800 may further include decreasing an autofocus latency at the image capture device by increasing the frame rate and increasing an autofocus accuracy at the image capture device by reducing the exposure time and increasing the image signal gain. For example, as shown in FIG. 3, the autofocus latency 318 may be decreased at the autofocus device 306 by increasing the frame rate 308 using the autoexposure control device 304. Also, as shown in FIG. 4, for example, the accuracy 420 of the autofocus device 406 may be increased by reducing the exposure time 410 and increasing the gain 412 of the image signal using the autoexposure control device 404.

Figure 9:
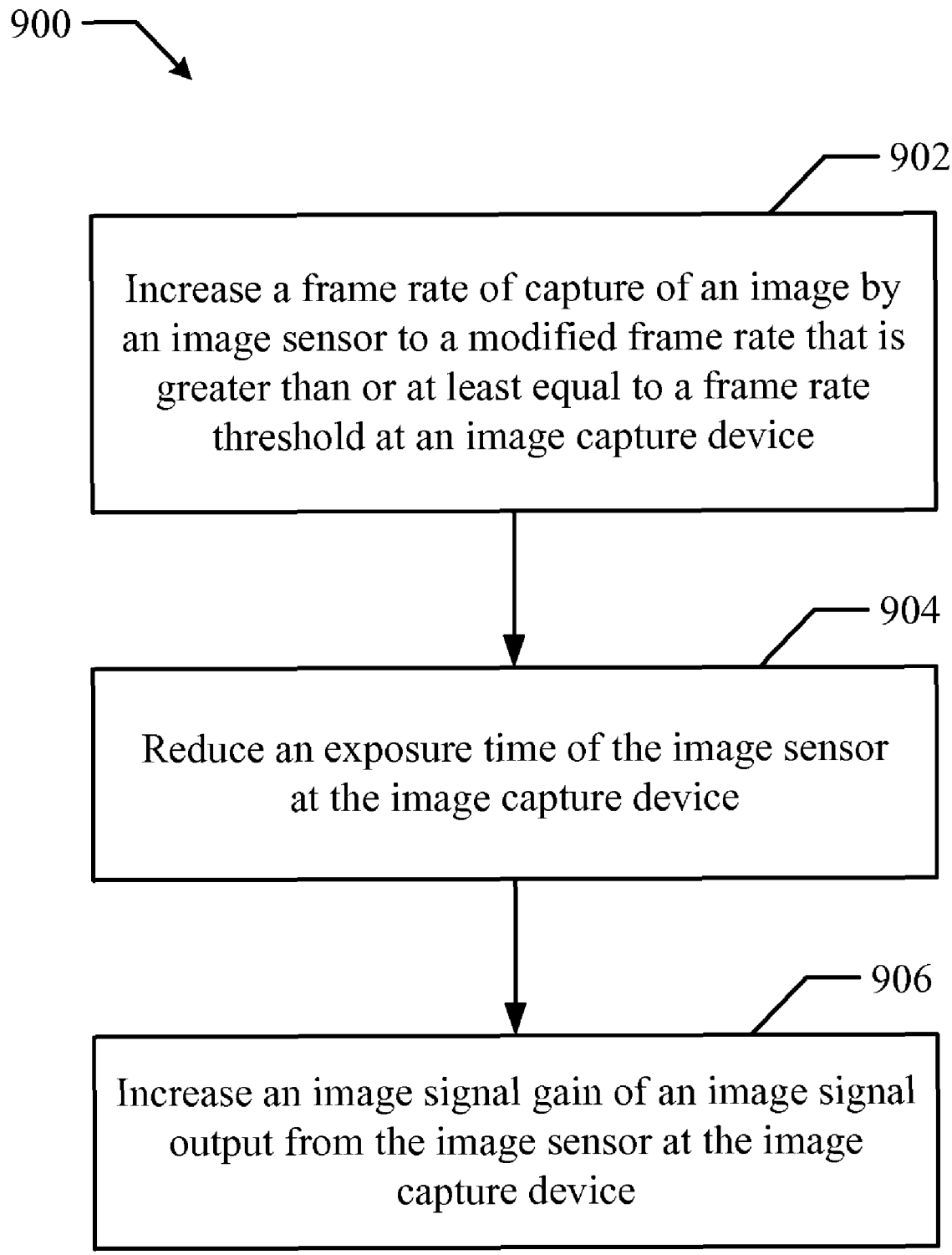
FIG. 9 is a flow diagram of a particular illustrative embodiment of a method to perform an autofocus operation assisted by autoexposure control.

Referring to FIG. 9, a flow diagram of a particular illustrative embodiment of a method to perform an autofocus operation assisted by autoexposure control is shown at 900. A computer-readable medium may be provided, such as the memory 116 shown in FIG. 1. The computer-readable medium includes computer executable instructions that are operative to cause a computer to increase a frame rate of capture of an image by an image sensor to a modified frame rate that is greater than or at least equal to a frame rate threshold at an image capture device, at 902. The computer-readable medium includes computer executable instructions that are operative to cause the computer to reduce an exposure time of the image sensor at the image capture device, at 904. The computer-readable medium further includes computer executable instructions that are operative to cause the computer to increase an image signal gain of an image signal output from the image sensor at the image capture device, at 906. In a particular embodiment, the frame rate threshold may be a maximum frame rate for the image capture device. In another particular embodiment, the computer-readable medium includes computer executable instructions that are operative to cause the computer to reduce an integration time of integrating the image at the image sensor of the image capture device when the frame rate is not less than the frame rate threshold.

Figure 10:
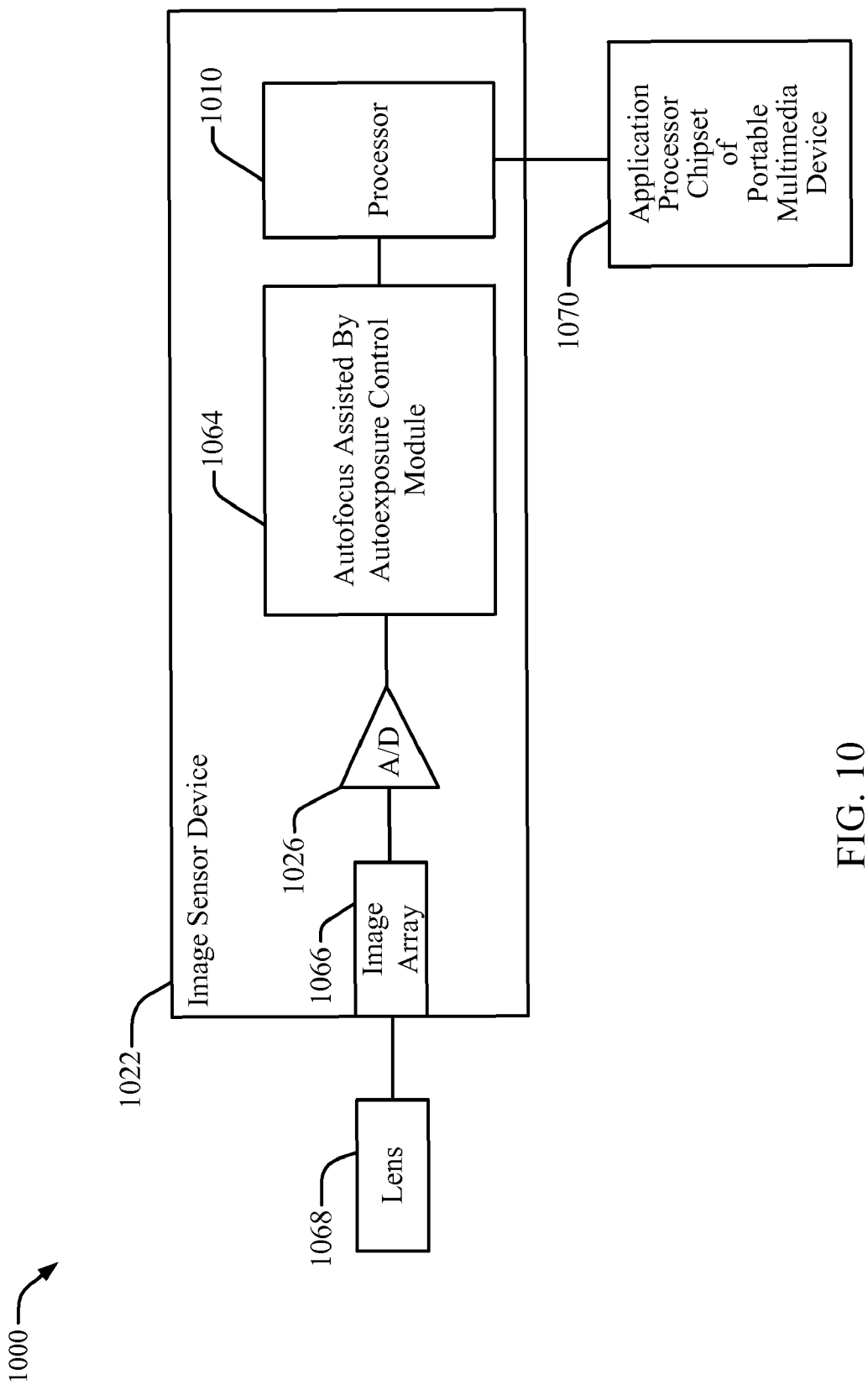
FIG. 10 is a block diagram of a particular embodiment of a device including an autofocus assisted by autoexposure control module.

FIG. 10 is a block diagram of particular embodiment of a system including an autofocus assisted by autoexposure control module. The system 1000 includes an image sensor device 1022 that is coupled to a lens 1068 and also coupled to an application processor chipset of a portable multimedia device 1070. The image sensor device 1022 includes an autofocus assisted by autoexposure control module 1064 to assist an autofocus operation using an autoexposure control device, such as by implementing one or more of the systems of FIGS. 1-6, by operating in accordance with any of the methods of FIGS. 7-9, or any combination thereof.

The autofocus assisted by autoexposure control module 1064 is coupled to receive image data from an image array 1066, such as via an analog-to-digital convertor 1026 that is coupled to receive an output of the image array 1066 and to provide the image data to the autofocus assisted by autoexposure control module 1064.

The image sensor device 1022 may also include a processor 1010. In a particular embodiment, the processor 1010 is configured to implement the autofocus assisted by autoexposure control module 1064. In another embodiment, the autofocus assisted by autoexposure control module 1064 is implemented as image processing circuitry.

The processor 1010 may also be configured to perform additional image processing operations, such as one or more of the operations performed by the digital signal processor 114 of FIG. 1. The processor 1010 may provide processed image data to the application processor chipset of the portable multimedia device 1070 for further processing, transmission, storage, display, or any combination thereof.

Figure 11:
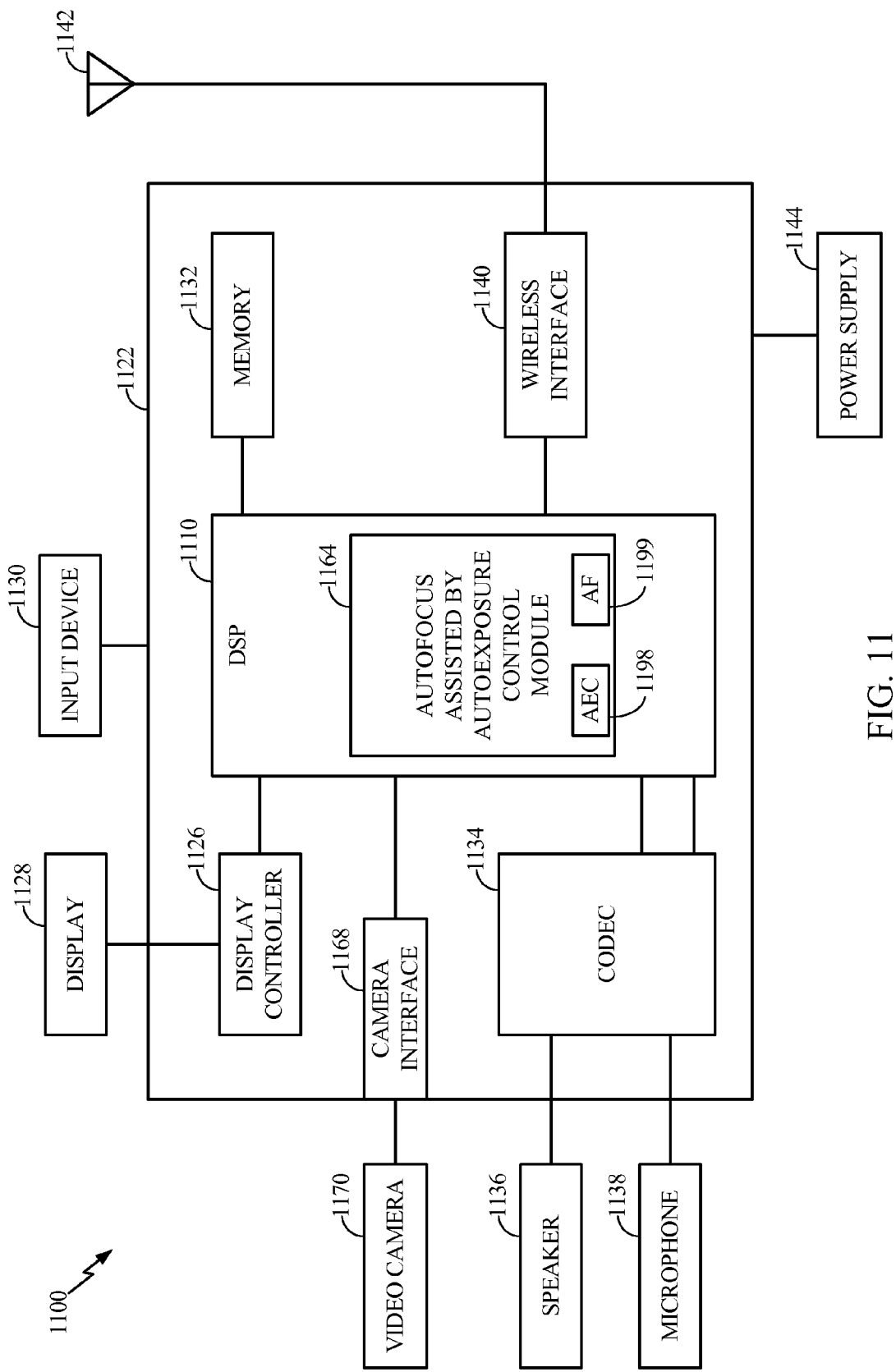
FIG. 11 is a block diagram of a particular embodiment of a portable communication device including an autofocus assisted by autoexposure control module.

FIG. 11 is a block diagram of particular embodiment of a system including an autofocus assisted by autoexposure control module. The system 1100 may be implemented in a portable electronic device and includes a signal processor 1110, such as a digital signal processor (DSP), coupled to a memory 1132. The system 1100 includes an autofocus assisted by autoexposure control module 1164. In an illustrative example, the autofocus assisted by autoexposure control module 1164 includes any of the systems of FIGS. 1-6, operates in accordance with any of the methods of FIGS. 7-9, or any combination thereof. The autofocus assisted by autoexposure control module 1164 may be in the signal processor 1110 or may be a separate device. The autofocus assisted by autoexposure control module 1164 includes means for controlling an autoexposure 1198 and means for performing an autofocus operation 1199. The means for controlling an autoexposure 1198 and means for performing an autofocus operation 1199 may include hardware circuitry, firmware, a processor or a controller executing code, a field programmable array, or any combination thereof.

A camera interface 1168 is coupled to the signal processor 1110 and also coupled to a camera, such as a video camera 1170. A display controller 1126 is coupled to the signal processor 1110 and to a display device 1128. A coder/decoder (CODEC) 1134 can also be coupled to the signal processor 1110. A speaker 1136 and a microphone 1138 can be coupled to the CODEC 1134. A wireless interface 1140 can be coupled to the signal processor 1110 and to a wireless antenna 1142.

The signal processor 1110 may also be adapted to generate processed image data. The display controller 1126 is configured to receive the processed image data and to provide the processed image data to the display device 1128. In addition, the memory 1132 may be configured to receive and to store the processed image data, and the wireless interface 1140 may be configured to receive the processed image data for transmission via the antenna 1142.

In a particular embodiment, the signal processor 1110, the display controller 1126, the memory 1132, the CODEC 1134, the wireless interface 1140, and the camera interface 1168 are included in a system-in-package or system-on-chip device 1122. In a particular embodiment, an input device 1130 and a power supply 1144 are coupled to the system-on-chip device 1122. Moreover, in a particular embodiment, as illustrated in FIG. 11, the display device 1128, the input device 1130, the speaker 1136, the microphone 1138, the wireless antenna 1142, the video camera 1170, and the power supply 1144 are external to the system-on-chip device 1122. However, each of the display device 1128, the input device 1130, the speaker 1136, the microphone 1138, the wireless antenna 1142, the video camera 1170, and the power supply 1144 can be coupled to a component of the system-on-chip device 1122, such as an interface or a controller.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disk read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

The invention claimed is:

1. A method comprising:
    comparing a frame rate of image capture by an image sensor to a frame rate threshold at an image capture device;
    when the frame rate is less than the frame rate threshold, increasing the frame rate to a modified frame rate that is greater than or equal to the frame rate threshold;
    decreasing an integration time and increasing an image signal gain at the image capture device to adjust an image brightness level before performing an autofocus operation on an image captured at the modified frame rate; and
    performing an autofocus operation on the image captured at the modified frame rate.

2. The method of claim 1, wherein the frame rate threshold is a maximum frame rate for the image capture device and wherein the modified frame rate is approximately equal to the maximum frame rate.

3. The method of claim 1, wherein the modified frame rate is in a range of about 1.5 times the frame rate to about three times the frame rate.

4. The method of claim 1, wherein the modified frame rate is approximately two times the frame rate.

5. The method of claim 1, further comprising reducing an exposure index at the image capture device before performing the autofocus operation.

6. The method of claim 1, wherein the image capture device comprises one of a digital camera, a digital video camera, and a camera-phone.

7. The method of claim 1, further comprising reducing an integration time at the image capture device when the frame rate is not less than the frame rate threshold.

8. The method of claim 1, wherein the image comprises one or more pixels of image data and the autofocus operation on the image includes consideration of all of the one or more pixels of image data.

9. An image capture method comprising:
    capturing a first image at a frame rate of image capture using a lens system coupled to an image sensor of an image capture device;
    adjusting an image signal gain of an image signal output from the image sensor;
    processing the adjusted image signal using a digital signal processor in the image capture device, the digital signal processor coupled to an autoexposure controller and to an autofocus device in the image capture device;
    increasing the frame rate of image capture by the image sensor of the image capture device using the autoexposure controller when the frame rate is below a predetermined frame rate;
    reducing an exposure time of the image sensor of the image capture device using the autoexposure controller after increasing the frame rate;
    capturing a second image at the increased frame rate of image capture using the lens system coupled to the image sensor of the image capture device;
    increasing the image signal gain to adjust a brightness level of the second image;
    performing an autofocus operation using the autofocus device to adjust a lens position of the lens system to focus the second image; and
    decreasing an autofocus latency by increasing the frame rate and increasing an autofocus accuracy by reducing the exposure time and increasing the image signal gain.

10. The image capture method of claim 9, further comprising determining the lens position corresponding to a highest image contrast of the second image.

11. The image capture method of claim 10, further comprising returning the frame rate, the exposure time, and the image signal gain to original values after the lens position is determined.

12. The image capture method of claim 9, further comprising reducing an exposure index at the image capture device using the autoexposure controller and increasing the image signal gain to adjust the brightness level of the image using the autoexposure controller.

13. The image capture method of claim 9, further comprising decreasing an integration time of integrating the image at the image sensor of the image capture device.

14. The image capture method of claim 9, further comprising reducing an integration time of integrating the image at the image sensor of the image capture device when the frame rate is not less than the predetermined frame rate.

15. The method of claim 9, wherein the second image comprises one or more pixels of image data and the autofocus operation on the second image includes consideration of all of the one or more pixels of image data.

16. An image capture device comprising:
    an image sensor configured to capture an image comprising one or more pixels of image data;
    an autoexposure control device configured to:
        increase a frame rate of image capture by the image sensor to an increased frame rate when the frame rate is less than a frame rate threshold;
        reduce an integration time of the image sensor to a reduced integration time when the frame rate is less than a frame rate threshold; and
        increase an image signal gain of an image signal output from the image sensor to an increased image signal gain to adjust an image brightness level when the frame rate is less than a frame rate threshold; and
    an autofocus device configured to perform an autofocus operation on the image using the increased frame rate, the reduced integration time, and the increased image signal gain.

17. The image capture device of claim 16, wherein the autoexposure control device is further configured to reduce an exposure index of the image sensor.

18. The image capture device of claim 16, wherein the autofocus device is further configured to perform the autofocus operation on the image by considering all of the one or more pixels of image data representing the image.

19. An image capture device comprising:
    an image sensor configured to capture an image comprising one or more pixels of image data;
    means for controlling an autoexposure configured to:
        increase a frame rate of image capture by the image sensor to an increased frame rate when the frame rate is less than a frame rate threshold;
        reduce an integration time of the image sensor to a reduced integration time when the frame rate is less than a frame rate threshold; and
        increase an image signal gain of an image signal output from the image sensor to an increased image signal gain to adjust an image brightness level when the frame rate is less than a frame rate threshold; and means for performing an autofocus operation on the image using the increased frame rate, the reduced integration time, and the increased image signal gain.

20. A portable device including a camera, the portable device comprising:

an image sensor configured to capture an image comprising one or more pixels of image data;

an autoexposure control device configured to:

increase a frame rate of image capture of the image sensor to a modified frame rate when the frame rate is less than a frame rate threshold;

reduce an integration time at the camera to a reduced integration time when the frame rate is less than a frame rate threshold; and increase an image signal gain at the camera to an increased image signal gain to adjust an image brightness level when the frame rate is less than a frame rate threshold; and means for performing an autofocus operation on an image captured at the modified frame rate, the reduced integration time, and the increased image signal gain.

21. The portable device of claim 20, wherein the autoexposure control device and the means for performing the autofocus operation are disposed in an application chipset within the portable device.

22. The portable device of claim 20, wherein the autoexposure control device and the means for performing the autofocus operation are disposed in an image sensor of the portable device.

23. The image capture device of claim 20, wherein the means for performing an autofocus operation is further configured to perform the autofocus operation on the image by considering all of the one or more pixels of image data representing the image.

24. A computer-readable medium including computer executable instructions that are operative to cause a computer to:

increase a frame rate of capture of an image by an image sensor to a modified frame rate that is greater than or at least equal to a frame rate threshold at an image capture device;

reduce an exposure time of the image sensor at the image capture device;

increase an image signal gain of an image signal output from the image sensor at the image capture device; and reduce an integration time of integrating the image at the image sensor of the image capture device when the frame rate is not less than the frame rate threshold.

25. The computer-readable medium of claim 24, wherein the frame rate threshold is a maximum frame rate for the image capture device.

* * * * *